(12) United States Patent
Liran

(10) Patent No.: US 8,024,599 B2
(45) Date of Patent: Sep. 20, 2011

(54) BIAS AND RANDOM DELAY CANCELLATION

(75) Inventor: Tuvia Liran, Kiryat Tivon (IL)

(73) Assignee: SanDisk IL Ltd, Kfar Saba (IL)

(*) Notice: Subject to any disclaimer, the term of this patent is extended or adjusted under 35 U.S.C. 154(b) by 810 days.

(21) Appl. No.: 12/043,964

(22) Filed: Mar. 7, 2008

(65) Prior Publication Data

US 2008/0222445 A1    Sep. 11, 2008

Related U.S. Application Data

(60) Provisional application No. 60/893,641, filed on Mar. 8, 2007.

(51) Int. Cl.
| G06F 1/14 | (2006.01) |
| G06F 1/12 | (2006.01) |
| G06F 1/10 | (2006.01) |
| H04L 7/00 | (2006.01) |
| G11B 21/03 | (2006.01) |
| G11B 20/20 | (2006.01) |

(52) U.S. Cl. ........ 713/503; 713/400; 713/401; 713/500; 713/501; 713/502; 713/600; 713/601; 714/700; 714/744; 375/354; 375/355

(58) Field of Classification Search .................. 713/400, 713/401, 500–503, 600–601; 714/700, 744; 375/354, 355
See application file for complete search history.

(56) References Cited

U.S. PATENT DOCUMENTS

| 6,643,787 B1* | 11/2003 | Zerbe et al. ................... 713/400 |
| 2002/0083359 A1* | 6/2002 | Dow ............................. 713/500 |
| 2003/0086339 A1* | 5/2003 | Dally et al. ................... 368/202 |
| 2006/0050822 A1 | 3/2006 | Panikkar et al. |
| 2007/0248201 A1* | 10/2007 | Ker et al. ...................... 375/355 |

FOREIGN PATENT DOCUMENTS

EP    1696600    8/2006

OTHER PUBLICATIONS

Gorgaert S. et al. "A skew tolerant CMOS level-based ATM data-recovery system without PLL topology" *Custom integrated circuits conference 1997*. Proceedings of the IEEE 1997 Santa Clara, CA. USA May 5-8, 1997. New York, NY, USA, IEEE, US May 5, 1997. pp. 453-456.

* cited by examiner

*Primary Examiner* — Thomas Lee
*Assistant Examiner* — Fahmida Rahman
(74) *Attorney, Agent, or Firm* — Martine Penilla & Gencarella, LLP

(57) ABSTRACT

A system and method for digital communication wherein a host provides a host clock and a clockless device transmits to the host a bit stream synchronized according to the clock at a data rate that is an integer multiple of the clock rate. A training mechanism using training data detects time skew between host clock and bit stream, and a digital skew compensation mechanism compensates, substantially in real time, for the skew and for variations in the skew that may occur with the passage of time, in accordance with a vote among at least three samples of a bit of the bit stream, subsequent sampling being retarded or advanced if, respectively, an early or late sample is in disagreement with the vote. Preferably, the compensation value is selected from at least four possible compensation values, and can be stored in a memory to hasten subsequent restarts of the system.

26 Claims, 5 Drawing Sheets

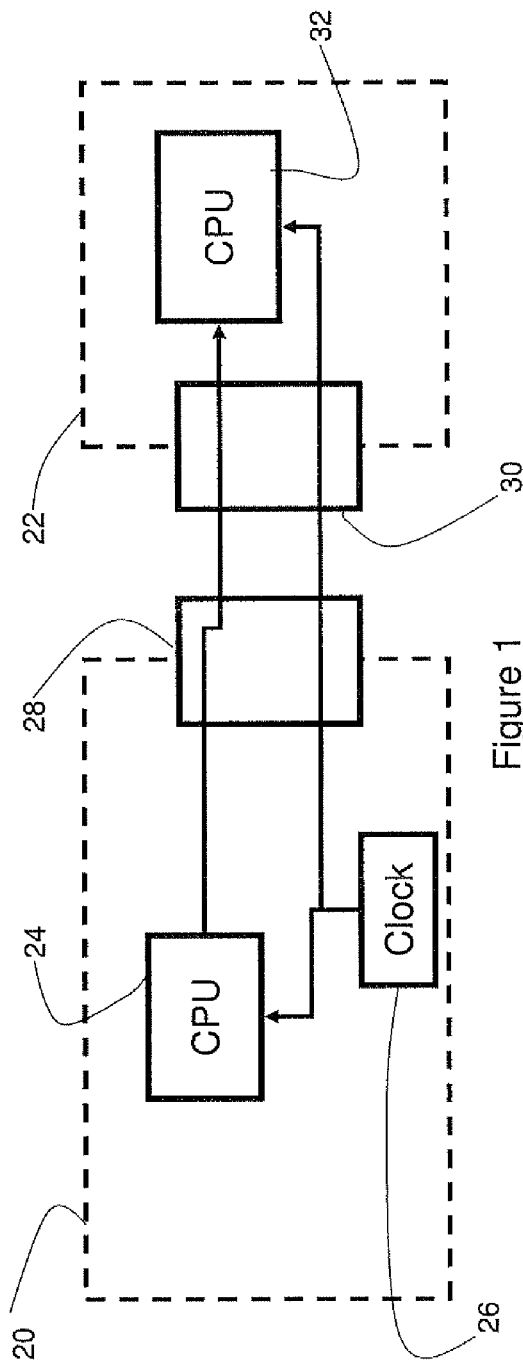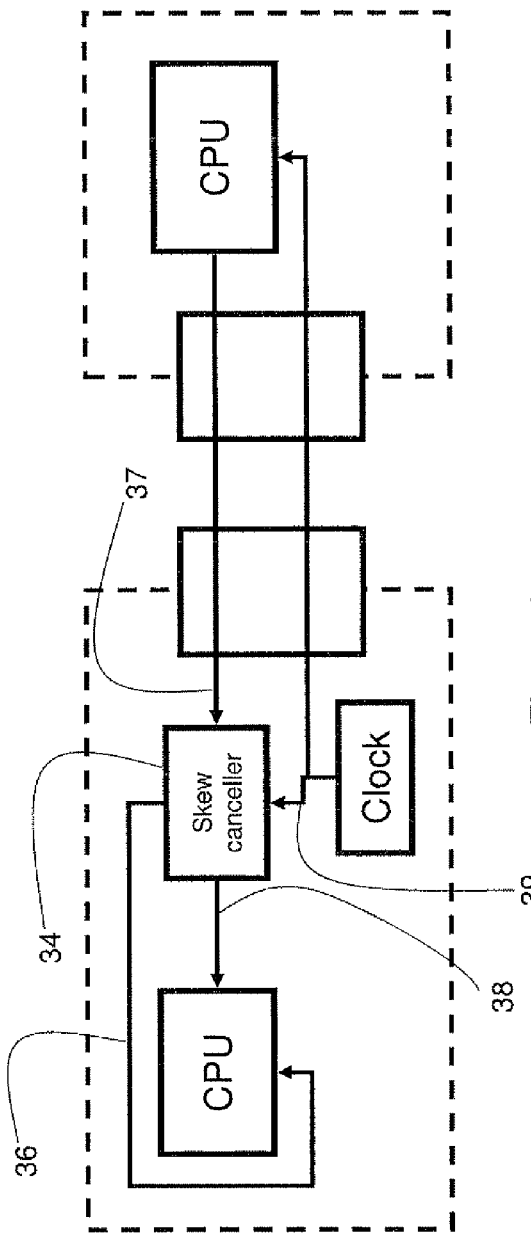

BIAS AND RANDOM DELAY CANCELLATION

This application claims the benefit of and incorporates by reference U.S. Provisional Patent Application No. 60/893,641, filed Mar. 8, 2007, title: Bias and random delay cancellation.

FIELD AND BACKGROUND

The present invention relates to digital data communication and more particularly to a system and method for data synchronization in digital data communication.

Data synchronization is a well known process in the art of digital communication, serving to ensure that a receiver will sample each data symbol of the received signal at one or more points in time during the presence of the data symbol at which the data symbol is stable. A typical approach is to sample the data symbols as close as possible to their center.

In a short-range wired communication system, the transmitting device typically sends a data signal and a separate clock signal. The clock signal indicates to the receiving device when to sample the data. In SDR systems, where each bit of data is accompanied by a pulse of the clock, there is generally no need for the receiving device to adjust the timing of the sampling of the data, and no special synchronization process is required.

However, in modern data communication devices, the bit rate of the data is often higher than the pulse rate of the clock, as is the case, for example, in DDR (Double Data Rate) and QDR (Quad Data Rate), which are two approaches to transmission of data at bit rates greater than the clock rate. In such systems, the receiver has to create a sampling signal that has a frequency higher than the clock frequency, typically an integer multiple of the clock frequency, and sample the bit stream using this frequency-multiplied sampling signal.

In DDR and QDR systems that support bi-directional communication between two devices, one approach is for each of the devices to have its own clock. Typically, the clock of the transmitting device act as the primary frequency standard, and the receiving device synchronizes on the clock of the transmitting device. This half-duplex method is known in the art as "source synchronous".

When the direction of transmission is reversed the clock of the formerly receiving, and now transmitting, device becomes the primary frequency standard, and the clock of the formerly transmitting, and now receiving, device synchronizes on the clock of the transmitting device.
With the development of electronic devices, such as data storage devices, it has become possible to make portable devices very small. With miniaturization, however, power consumption and connectivity are more challenging.

SUMMARY OF EMBODIMENTS

In order to further facilitate the above-mentioned miniaturization, it is desirable to limit the number of pins on connectors, and to reduce the amount of circuitry in these devices and to reduce the amount of power dissipated by these devices. Thus, it would be advantageous to substantially reduce or eliminate the need to include a high-frequency clock within these small devices.

It would be further advantageous to have bi-directional multi-bit per clock pulse communication between a host and a device, without the need to build a clock into the device, and with compensation for errors in the timing of the sampling signals of the host receiver and the device receiver caused by both bias errors and random delay errors. There is thus an advantage in providing bias and random delay compensation in a data communication system.

Multi-bit per clock pulse communication has the advantage of using a slower clock, which is less noisy and consumes less power.

Various embodiments realize such advantages, examples of which are provided herein.

One embodiment is a system for a digital communication system including; (a) a digital communication system including: (a) a host, the host including: (i) a clock operative to produce a clock signal having a clock rate; (ii) a receiver operative to sample bits of a bit stream according to a sampling timing determined according to the clock signal; (iii) a skew compensation mechanism operative to adjust the sampling timing; (iv) a voting mechanism operative to detect a skew between the clock signal and the bit stream according to a vote among at least three samples of a bit of the bit stream, and to adjust, via the skew compensation mechanism, the sampling timing so as to compensate for the skew, and (v) a training mechanism operative to detect a skew between the clock signal and a training bit stream, the training mechanism being further operative, via the skew compensation mechanism, to adjust the sampling timing so as to compensate for the skew, and (b) a device operative to transmit the bit stream and the training bit stream to the host, the bit stream and the training bit stream being synchronized according to the clock signal supplied by the host, the device lacking a clock, and wherein the skew compensation mechanism is operative to adjust, substantially in real time, the sampling timing so as to compensate for the skew.

As implemented in this system the samples in the vote include at least one early sample, at least one intermediate sample and at least one late sample.

Further in this system, the skew compensation mechanism includes a digitally adjustable sampling control mechanism operative to adjust timing of sampling of a bit of the bit stream according to a digital value, the digital value being in accordance with the vote.

Further in the system, the host is operative to store the digital value in a memory, and to subsequently restore the digital value according to the memory.

Further in the system, the digitally adjustable sampling control mechanism is operative to adjust timing of sampling of a bit of the bit stream according to a digital value that can be selected from at least four possible digital values.

Further in the system, the compensation includes retarding sampling of a subsequent bit if at least one early sample is in disagreement with the vote.

Alternatively in the system, the compensation includes advancing sampling of a subsequent bit if at least one late sample is in disagreement with the vote.

In one embodiment, the compensation includes retarding sampling of a subsequent bit if at least one early sample is in disagreement with the vote and the compensation further includes advancing sampling of a subsequent bit if at least one late sample is in disagreement with the vote.

Further in the system, the bit stream includes user data.

Further in the system, the bit stream has a bit rate twice the clock rate.

Alternatively in the system the bit stream has a bit rate quadruple the clock rate.

Alternatively in the system, the bit stream has a bit rate eight times the clock rate.

In one embodiment of the system the bit stream has a bit rate that is an integer multiple of the clock rate.

Another embodiment is a system for a digital communication system including a host, the host including: (a) a clock operative to produce a clock signal having a clock rate; (b) a receiver operative to sample bits of a bit stream according to a sampling timing determined according to the clock signal; (c) a skew compensation mechanism operative to adjust the sampling timing; (d) a voting mechanism operative to detect a skew between the clock signal and the bit stream according to a vote among at least three samples of a bit of the bit stream, and to adjust, via the skew compensation mechanism, the sampling timing so as to compensate for the skew, and (e) a training mechanism operative to detect a skew between the clock signal and a training bit stream, the training mechanism being further operative, via the skew compensation mechanism, to adjust the sampling timing so as to compensate for the skew, and wherein the skew compensation mechanism is operative to adjust, substantially in real time, the sampling timing so as to compensate for the skew.

As implemented in this system, the samples in the vote include at least one early sample, at least one intermediate sample and at least one late sample.

Further in the system, the skew compensation mechanism includes a digitally adjustable sampling control mechanism operative to adjust timing of sampling of a bit of the bit stream according to a digital value, the digital value being in accordance with the vote.

Further in the system, the host is operative to store the digital value in a memory, and to subsequently restore the digital value according to the memory.

Further in the system, the digitally adjustable sampling control mechanism is operative to adjust timing of sampling of a bit of the bit stream according to a digital value that can be selected from at least four possible digital values.

Further in the system, the compensation includes retarding sampling of a subsequent bit if at least one early sample is in disagreement with the vote.

Alternatively in the system, the compensation includes advancing sampling of a subsequent bit if at least one late sample is in disagreement with the vote.

In one embodiment, the compensation includes retarding sampling of a subsequent bit if at least one early sample is in disagreement with the vote and wherein the compensation further includes advancing sampling of a subsequent bit if at least one late sample is in disagreement with the vote.

Further in the system, the bit stream includes user data.

Further in the system, the bit stream has a bit rate twice the clock rate.

Alternatively in the system, the bit stream has a bit rate quadruple the clock rate.

Alternatively in the system, the bit stream has a bit rate eight times the clock rate.

In one embodiment of the system, the bit stream has a bit rate that is an integer multiple of the clock rate.

Yet another embodiment is a system for a digital communication system including a device operative to be removably connected to a host, the device lacking a clock, the device including: (a) a receiver operative to sample bits of a bit stream according to a sampling timing determined according to a host clock signal; (b) a skew compensation mechanism operative to adjust the sampling timing; (c) a voting mechanism operative to detect a skew between the clock signal and the bit stream according to a vote among at least three samples of a bit of the bit stream, and to adjust, via the skew compensation mechanism, the sampling timing so as to compensate for the skew, and (d) a training mechanism operative to detect a skew between the clock signal and a training bit stream, the training mechanism being further operative, via the skew compensation mechanism, to adjust the sampling timing so as to compensate for the skew, and wherein the skew compensation mechanism is operative to adjust, substantially in real time, the sampling timing so as to compensate for the skew.

As implemented in this system, the samples in the vote include at least one early sample, at least one intermediate sample and at least one late sample.

Further in the system, the skew compensation mechanism includes a digitally adjustable sampling control mechanism operative to adjust timing of sampling of a bit of the bit stream according to a digital value, the digital value being in accordance with the vote.

Further in the system, the device is operative to store the digital value in a memory, and to subsequently restore the digital value according to the memory.

Further in the system, the digitally adjustable sampling control mechanism is operative to adjust timing of sampling of a bit of the bit stream according to a digital value that can be selected from at least four possible digital values.

Further in the system, the compensation includes retarding sampling of a subsequent bit if at least one early sample is in disagreement with the vote.

Alternatively in the system, the compensation includes advancing sampling of a subsequent bit if at least one late sample is in disagreement with the vote.

In one embodiment of the system, the compensation includes retarding sampling of a subsequent bit if at least one early sample is in disagreement with the vote and the compensation further includes advancing sampling of a subsequent bit if at least one late sample is in disagreement with the vote.

Further in the system, the bit stream includes user data.

Further in the system, the bit stream has a bit rate that is an integer multiple of the clock rate.

Still another embodiment is a method for digital communication including the steps of: (a) receiving by a host a bit stream transmitted from a device, the bit stream being synchronized according to a clock signal supplied by the host, the device lacking a clock; (b) detecting a skew between the host clock signal and the bit stream, and (c) compensating, substantially in real time, for the skew and for variations in the skew.

As implemented in this method, the compensating is in accordance with a vote among at least three samples of a bit of the bit stream, the at least three samples including at least one early sample, at least one intermediate sample and at least one late sample.

In one embodiment the method further includes the step of: (d) providing a digitally adjustable sampling control mechanism operative to adjust timing of sampling of a bit of the bit stream according to a digital value, and the compensating includes adjusting the digitally adjustable sampling control mechanism in accordance with the vote.

In one embodiment, the method further includes the steps of: (e) providing a digital memory; (f) storing the digital value in the memory, and (g) subsequently restoring the digital value according to the memory.

Further in the method, the digitally adjustable sampling control mechanism is operative to adjust timing of sampling of a bit of the bit stream according to a digital value that can be selected from at least four possible digital values.

Further in the method, the compensating includes retarding sampling of a subsequent bit if at least one early sample is in disagreement with the vote.

Alternatively in the method, the compensating includes advancing sampling of a subsequent bit if at least one late sample is in disagreement with the vote.

In one embodiment of the method, the compensating includes retarding sampling of a subsequent bit if at least one early sample is in disagreement with the vote and wherein the compensation further includes advancing sampling of a subsequent bit if at least one late sample is in disagreement with the vote.

Further in the method, the bit stream includes user data.

Further in the method, the detecting of the skew includes using a training bit stream.

Further in the method, the bit stream has a bit rate twice the clock rate.

Alternatively in the method, the bit stream has a bit rate quadruple the clock rate.

Alternatively in the method, the bit stream has a bit rate eight times the clock rate.

In one embodiment of the method, the bit stream has a bit rate that is an integer multiple of the clock rate.

BRIEF DESCRIPTION OF THE DRAWINGS

Various embodiments are illustrated in the accompanying drawings, wherein:

FIG. 1 is a block diagram of an embodiment of a data communication system;

FIG. 2 is a more detailed view of the data communication system of FIG. 2;

DETAILED DESCRIPTION OF EMBODIMENTS

Figure 3:
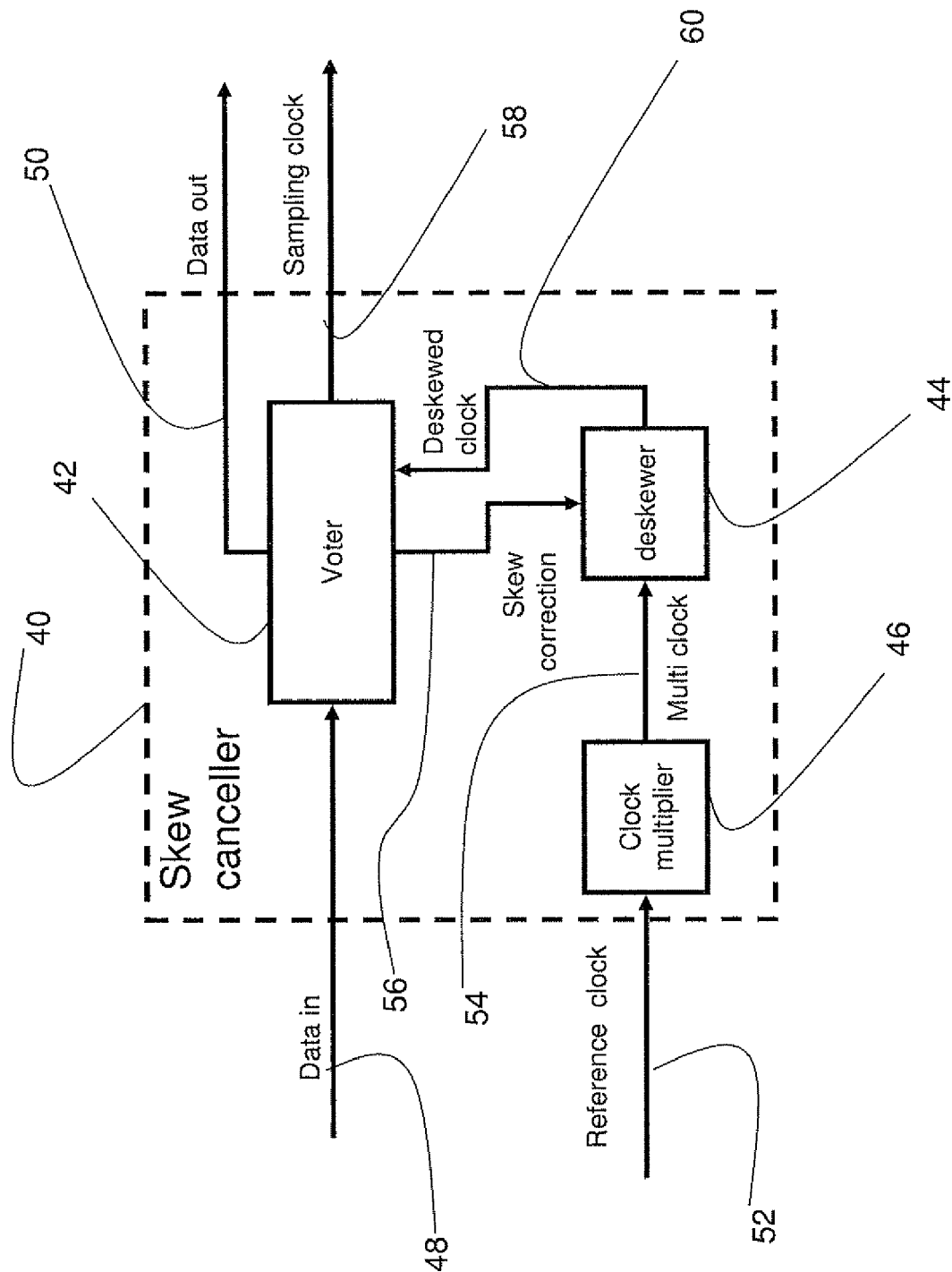
FIG. 3 is a block diagram of an embodiment of a skew canceller.

In the context of this application, various terms can be interpreted as set forth below.

As used herein, unless otherwise specified, the term "SDR" ("Single Data Rate") refers to a data communication system using a clock for ongoing synchronization, where the data bit rate is identical to the clock rate.

As used herein, unless otherwise specified, the term "MDR" ("Multiple Data Rate") refers to a data communication system using a clock for ongoing synchronization, where the data bit rate is a multiple of the clock rate.

As used herein, unless otherwise specified, the term "DDR" ("Double Data Rate") refers to an MDR where the multiple is 2.

As used herein, unless otherwise specified, the term "QDR" ("Quadruple Data Rate", or "Quad Data Rate") refers to an MDR where the multiple is 4.

As used herein, unless otherwise specified, the term "voting" refers a process of correction of slight and random synchronization errors between a clock signal and a bit stream, using multiple samples of a data pulse to sense the leading and/or trailing edge of the data pulse. Preferably, at least three samples are compared to each other. A mismatch between an early sample and a plurality of later samples that do match each other is an indication that the early sample was taken before settling of the pulse. A mismatch between a late sample and a plurality of earlier samples that do match each other is an indication that the late sample was taken after the trailing edge of the pulse.

As used herein, unless otherwise specified, the term "bias delay" refers to a delay between a clock signal and a bit stream resulting from generally fixed properties of the electronic system.

As used herein, unless otherwise specified, the term "random delay" refers to a delay between a clock signal and a bit stream resulting from random noise and jitter of the electronic system.

As used herein, unless otherwise specified, the term "user data" refers to payload data, as opposed to training sequence data.

It is to be noted that terms, such as "delay" or "skew", which refer to timing differences between signals can refer to positive or negative differences. Thus, a first signal that precedes a second signal can be said to be delayed relative to the second signal, the delay being negative.

Attention is now called to the detailed description of various embodiments implemented to enable a host to synchronize reception of a data stream from a device without the need for the device to send a separate synchronization signal along with the data stream. Embodiments so implemented, enable the host to synchronize reception of a data stream where the data stream has a bit rate that is a multiple of the frequency of a clock signal supplied by the host, and thereby address issues associated with miniaturization.

Although various embodiments can apply to data symbols that can assume any one of several values, as in QAM (Quadrature Amplitude Modulation), for the sake of brevity and clarity the following discussion will concentrate on the special case of binary signals.

A voting mechanism, described in detail below, detects a skew between a received bit stream and a received clock.

In one embodiment, the host uses a combination of the above-mentioned voting mechanism and a training mechanism, described in detail below, to synergistically adjust for the bias delay and the random delay caused by the physical configuration of the system and random noise in the system, as explained in detail below.

In the voting mechanism, at least three samples of a data bit are used to determine if the bit stream has a value of "1" or "0", and also to determine if the sampling of subsequent data bits should be advanced or retarded in time. The system uses this voting mechanism to synchronize the host clock with data coming from the clockless external device. The training mechanism provides for rapid correction of gross timing errors during system start-up, and the voting mechanism provides for ongoing correction of small timing errors while transmitting user data, without the need for including extra timing bits once the data link has been established.

If the data link carries a long monotonous data sequence, such as a long string of zeroes or a long string of ones, the voting mechanism will not discover timing errors during this sequence because there are not transitions to cause and early sample or a late sample to disagree with the majority. This problem can be solved by various methods such as, for example, encrypting the user data by an encryption method that does not produced long monotonous data strings. The maximum length of monotonous data strings that can be tolerated without uncorrectable timing errors is related to the stability of the various components of the system.

The host, in this system embodiment, contains a skew canceling circuit that detects the skew between the incoming data, which is transmitted by the device at a data rate that is a multiple of the host clock rate, and a sampling signal, local to the host, having a frequency that is a multiple of the host clock frequency, and synchronized to the host clock signal. The skew canceller feeds a CPU (Central Processing Unit) with data that are corrected by the voting, and with a sampling clock having a frequency equal to the data rate and which is deskewed to the correct phase.

In one embodiment, the skew canceller includes a digital delay line. In order to allow fine correction of a wide range of delays without introducing excessive jitter it is preferable that the digital delay line have a plurality of taps, preferably at least four in number.

This system uses a training sequence which allows for correction for the bias delay. This system also uses voting to correct for delays which vary with time during system operation. The synergetic integration of both methods, i.e., training and voting, into one system, enables, for the first time, the use of very high speed data communication with a clockless miniature storage device, with a very low rate of synchronization errors.

Preferably, the bias delay is saved in a digital memory, and the bias delay is subsequently restored from that memory when the system is restarted, thus saving the need to repeat the training sequence each time communication resumes.

The synergism between the random error correction and the bias error correction is a result of the fact that the bias correction is dependent upon a stable determination of the sequence that is read by the system. A jittered reading prevents a stable and smooth homing in on the correct bias delay. On the other hand, the corrected bias delay supports the operation of the voting mechanism, as it brings the sampling pulses very close to their correct timing relative to the data stream, leaving the voting mechanism to do only minor fine adjustments. This collaboration between the two delay compensation mechanisms enables this embodiment to provide stable, high speed communication between a host and a miniature storage device.

Attention is now called to FIG. 1. A host 20 is connected to a device 22 such as, for example, a memory card, via a serial connection. In FIG. 1 the data flow from a CPU 24 of host 20 to CPU 32 of device 22, passing through a host connector 28 and a device connector 30, and also pass through a data conditioning front end (not shown) operative to manage the serial connection protocol.

Although the present discussion concentrates on data transmission from device 22 to host 20, the training and the compensation for clock skew during transmission of user data described here can also be applied to the transmission of data from host 20 to device 22. However, it is to be noted that training an skew compensation are more important for data transmission from device 22 to host 20 because data received by host 20 from clockless device 22 are subject to more skew relative to clock 28.

A clock signal, generated in host clock 26, accompanies the data through the front ends and connectors 28 and 30, and provides device 22 with synchronization information for receiving data from host 20.

When data are communicated in an MDR system, such as DDR or QDR, the receiving device has to generate a multiple-rate clock based on the pulses of the host clock, and to synchronize the multiplied clock with the bit stream.

One solution to this problem involves using a voting mechanism as described above.

Attention is now called to FIG. 2. When device 22 sends data to host 20, there is a need to generate a sampling signal having a frequency that is an integer multiple of the frequency of host clock 26 and that is synchronized with the received bit stream.

Elements that are identical to the elements of FIG. 1 are not annotated in FIG. 2 to avoid clutter.

A skew canceller circuit 34 in host 20 receives the incoming bit stream and local clock 26 of host 20. Skew canceller 34 outputs two signals to host CPU 24: a synchronized, multiplied sampling clock 36, and a synthetic bit stream 38 which has undergone a voting process.

A difficulty in deskewing the relationship between host clock 26 and the data stream from device 22 without a clock reference from device 22 is the unknown delay that exists between clock signal 39 of local clock 26 and bit stream 37. This delay is caused by the intra-circuit delay in the electronics and by the physical distances within the system and can vary from single nanoseconds to tens of nanoseconds in the current state of the art.

This difficulty can be overcome by determining this unknown delay by applying, via a training mechanism, a training sequence, which is a predefined data sequence (such as, for example, 1-0-0-0), that device 22 sends to host 20. The training mechanism incorporates several elements of FIGS. 1, 2 and 3, i.e., device 22 (FIG. 1), operative to transmit the training sequence, skew canceller 34 (FIG. 2), operative to detect and correct clock skew, and host CPU 24 (FIG. 1) operative to control skew canceller 34 (FIG. 2). Skew canceller 34 (FIG. 2) is shown in further detail in FIG. 3 (where it is labeled with reference numeral 40). Voter 42, clock multiplier 46 and deskewer 44 of FIG. 3 are all parts of the training mechanism. Host 20 adjusts the delay between the signal of local clock 26 and the bit stream sampling signal until the training sequence is correctly received. Skew canceller 34 then stores this delay value and uses this delay value to delay clock signal 26, ensuring that the bit stream will be sampled at the correct times.

When communication is stopped intentionally, for example, due to power saving policy, the delay remains stored in host 20, and upon resumption of communication, that delay can be reapplied, saving the need to reiterate the training process each time the system is started.

Attention is now called to FIG. 3. Skew canceller 40 consists of three main components: a clock multiplier 46, a voting mechanism, voter 42 and a deskewer 44.

Clock multiplier 46 receives host clock signal 52 as input, and transmits a multiplied clock 54 to deskewer 44. Clock multiplier 46 generates a clock signal at the rate of the bit stream.

A digitally adjustable skew compensation mechanism, deskewer 44, receives multiplied clock 54 and a skew correction 56, and outputs a deskewed clock 60 that is in synchrony with the delayed bit stream. Deskewer 44 includes a digital delay line operative to delay the clock signal in accordance with skew correction 56 to compensate for the delay of the data stream. Because deskewer 44 is digital, deskewer 44 can store the delay upon stoppage of the clock indefinitely, and apply the delay upon resumption of system operation. Deskewer 44 is described in further detail below.

Voter 42 receives as input raw received data 48 from device 22 and the deskewed clock 60, and outputs to host CPU 24 a sampling clock 58 and synthetic data 50. Voter 42 decides if each data bit is "0" or "1" in accordance with the sampling result of at least three voting pulses.

Figure 4A:
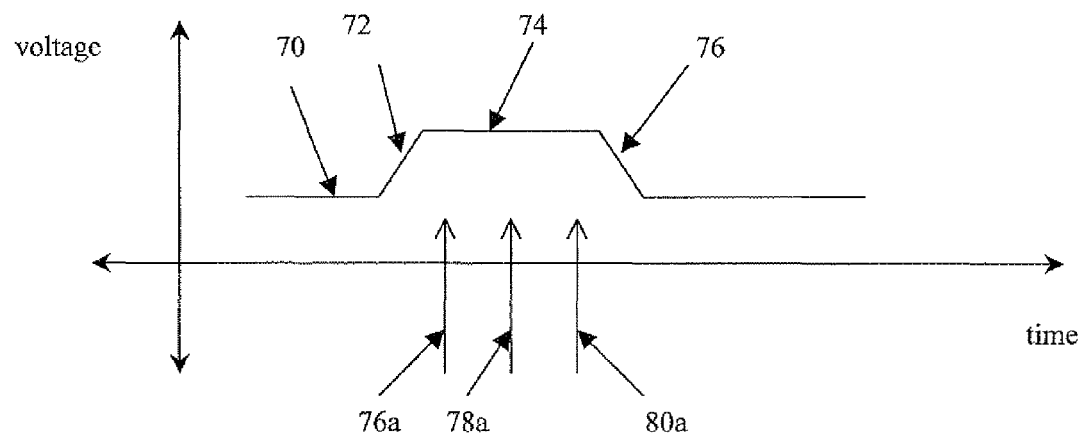
FIG. 4a is a timing diagram illustrating sampling of a bit which requires no timing correction.
Figure 4B:
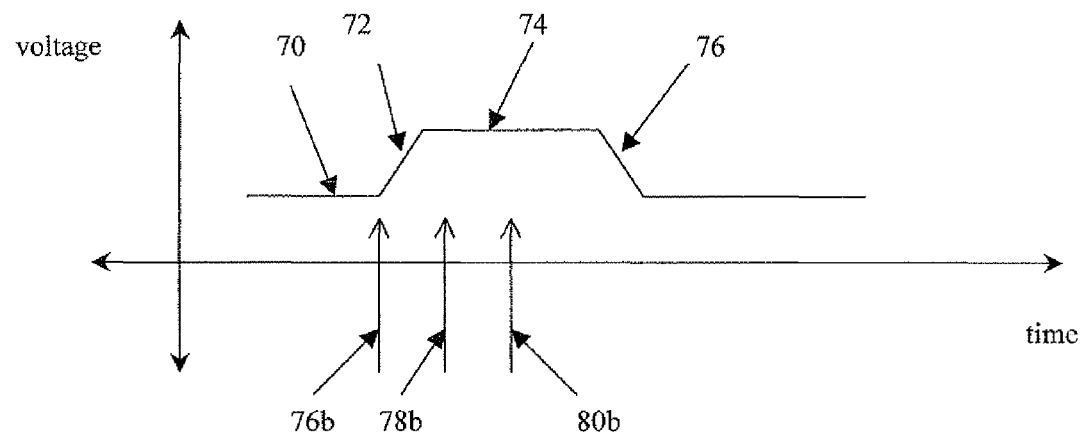
FIG. 4b is a timing diagram illustrating early sampling of a bit.
Figure 4C:
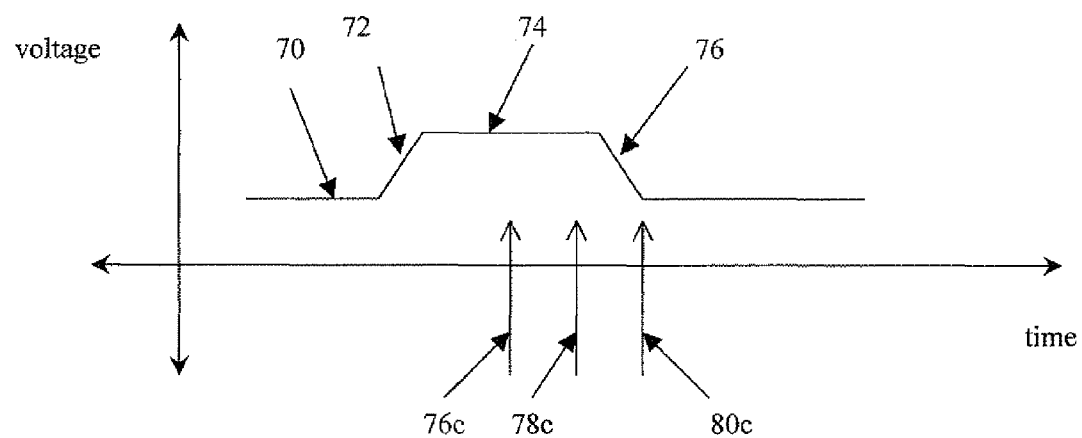
FIG. 4c is a timing diagram illustrating late sampling of a bit.

The voting mechanism, voter 42, detects a skew between a received bit stream and a received clock, as seen in the timing diagrams of FIGS. 4a-c.

In FIG. 4a, an exemplary signal 70 has, for a single bit, a rising interval 72, a stable interval 74 and a falling interval 76. In a voting system, an early sample 76a, an intermediate sample 78a and a late sample 80a of signal 70 are taken. In the case illustrated in FIG. 4a all three samples 76a, 78a and 80a agree, the bit is judged to be a logic "1", and there is no need to adjust the timing of sampling of subsequent bits.

In FIG. 4b, samples 76b, 78b and 80b of signal 70 are taken earlier than in FIG. 4a. In this case, early sample 76b is a logic "0" while intermediate sample 78b and late sample 80b are both logic "1". On the basis of this two to one majority, the bit is judged to be a logic "1". The disagreement between early sample 76b and samples 78b and 80b indicates that the sampling is being performed too early, and the voting mechanism adjusts the sampling timing so as to retard the sampling of subsequent bits as explained below.

In FIG. 4c, samples 76c, 78c and 80c of signal 70 are taken later than in FIG. 4a. In this case, early sample 76c and intermediate sample 78c are logic "1" while late sample 80c is logic "0". On the basis of this two to one majority, the bit is judged to be a logic "1". The disagreement between late sample 80c and samples 76c and 78c indicates that the sampling is being performed too late, and the voting mechanism adjusts the sampling timing so as to advance the sampling of subsequent bits.

Figure 5:
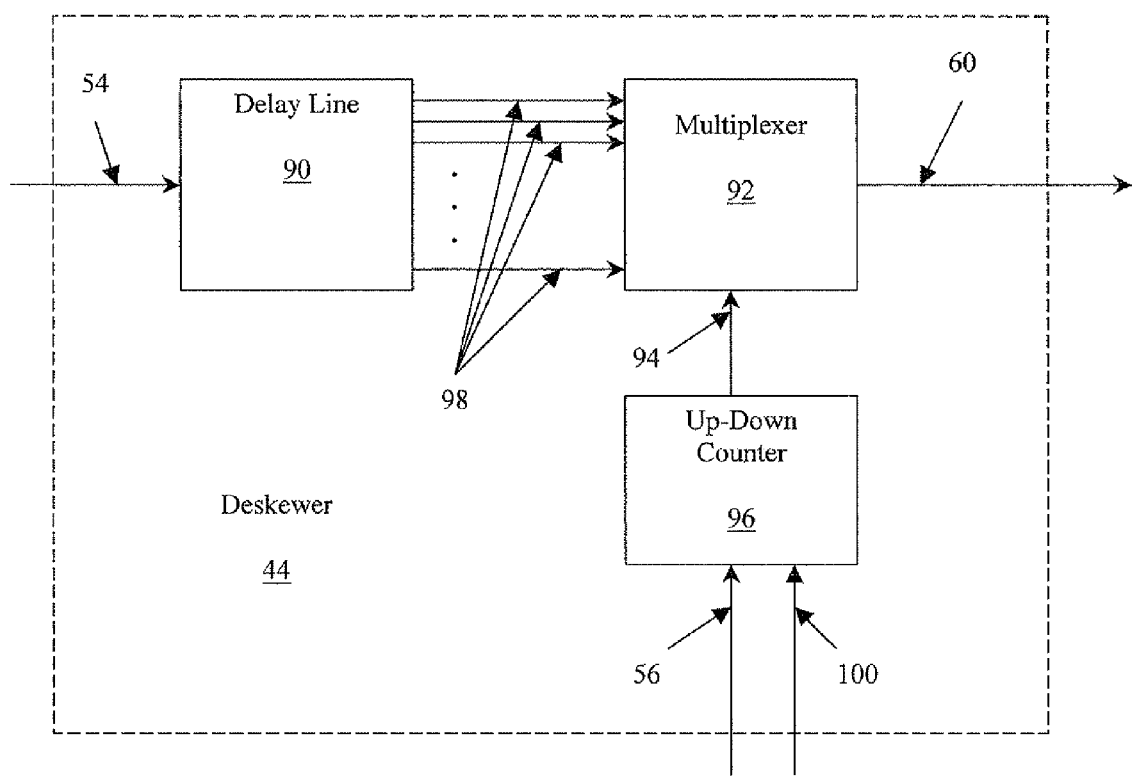
FIG. 5 is a block diagram of a deskewer.

FIG. 5 is a block diagram of an example of a skew compensation mechanism, or deskewer, 44, operative to deskew multiplied clock 54. Multiplied clock 54 is input to a delay line 90 having multiple taps 98, each tap 98 having a different delay. A multiplexer 92 is operative to select the delayed multiplied clock signal on one of the multiple taps 98 according to a tap selection signal 94 output by an up-down counter 96. Tap selection signal 94 reflects the state of up-down counter 96. The output of multiplexer 92 is the deskewed clock 60.

Up-down counter 96 can take on any of a number of values, or states, this number being equal to the number of taps 98. This number determines the resolution with which the system can correct for clock skew. If tap selection signal 94 is implemented with binary signals, tap selection signal 94 must have a number of lines at least equal to the base 2 logarithm of the number of taps 98.

During normal operation of the system, up-down counter 96 is controlled by skew correction 56. Skew correction 56 can, at any time, have one of three values, the values being "increment", "decrement" and "no change". Thus, if skew correction 56 is implemented with binary signals, skew correction 56 must have at least two lines.

Because multiplied clock 54 is substantially periodic, it is advantageous for up-down counter 96 to be of a type that "wraps around". Thus, if up-down counter 96 is in a state where the tap 98 with the maximal delay is selected, and skew correction 56 has the value "increment", up-down counter 96 will switch to the state where the tap 98 having the minimal delay is selected. Similarly, if up-down counter 96 is in a state where the tap 98 with the minimal delay is selected, and skew correction 56 has the value "decrement", up-down counter 96 will switch to the state where the tap 98 having the minimal delay is selected.

If up-down counter 96 is in a state where a tap 98 having a delay other than the maximal delay is selected, and the skew correction 56 has the value "increment", up-down counter 96 will switch to the state where tap 98 having the next greater delay is selected. If up-down counter 96 is in a state where a tap 98 having a delay other than the minimal delay is selected, and the skew correction 56 has the value "decrement", up-down counter 96 will switch to the state where tap 98 having the next shorter delay is selected. If skew correction 56 has the value "no change", up-down counter 96 does not change state.

In one embodiment, a pre-set input 100 provides for the setting of up-down counter 96 to an arbitrary value. Thus, during training, CPU 24 (FIG. 1) can arbitrarily select, via pre-set input 100, various taps 98 until the training sequence is properly received. Pre-set input 100 also provides for setting up-down counter, according to a memory (not shown), the memory storing a previously-used value of up-down counter 96, thus saving the need to perform training if there has been no substantial change to the clock skew since the previously-used value was selected. The memory can be located in host 20 (FIG. 1) or in device 22 (FIG. 1).

Figure 6:
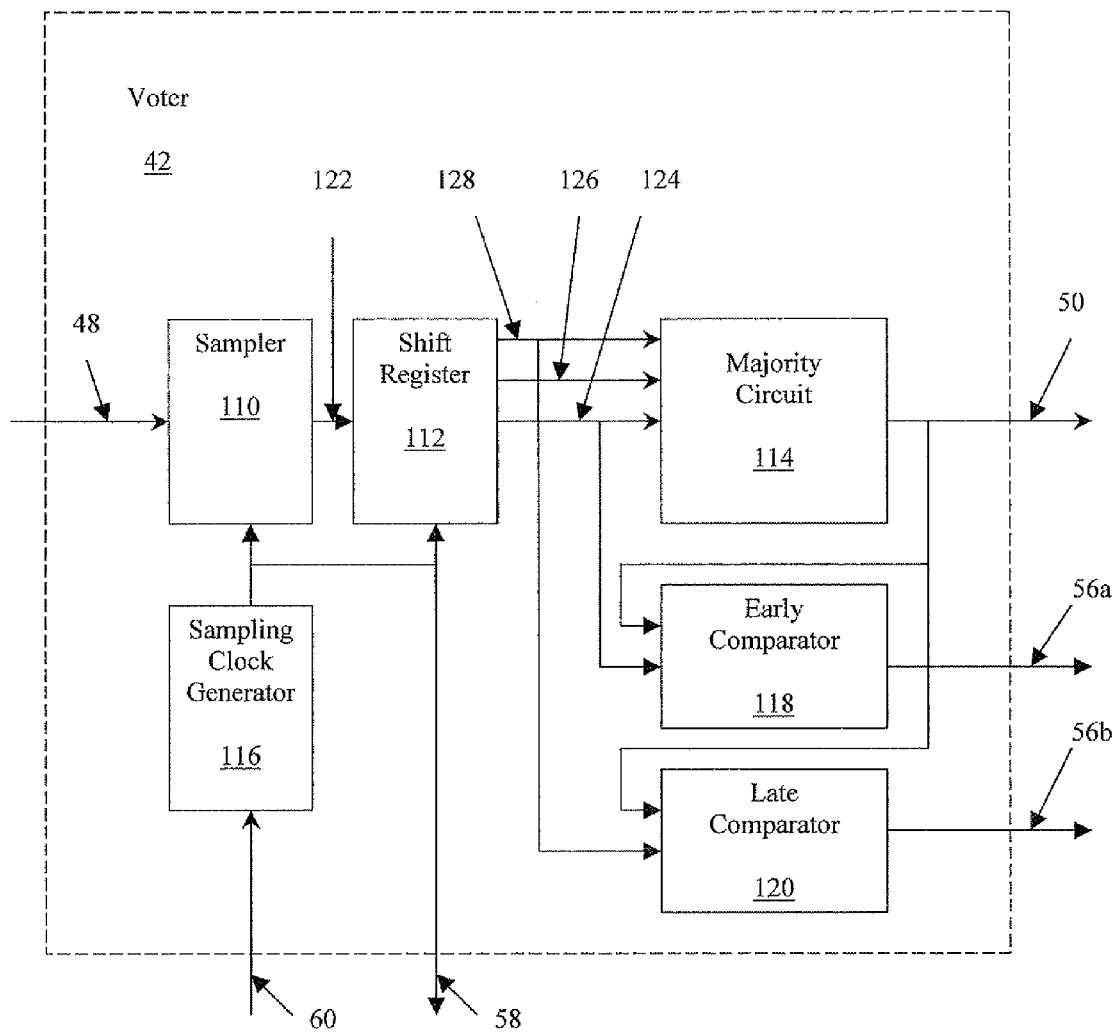
FIG. 6 is a block diagram of a voter.

FIG. 6 is a block diagram of an example of a voting mechanism, or voter, 42, operative to determine the value of a data bit of received data 48 according to a majority vote among three samples of the bit and to produce a skew correction 56 according to the relationship of early and late samples of received data 48 to the majority.

A sampling clock generator 16 is operative to produce a train of three pulses of sampling clock 58 for each pulse of deskewed clock 60.

Each pulse of sampling clock 58 triggers a sampler 110 to capture a sample 122 of incoming data 48. These samples 122 are fed to shift register 112, which shifts samples 122 according to sampling clock 58. Thus, shift register 112a outputs an early sample 124, an intermediate sample 126 and a late sample 128 for each pulse of deskewed clock 60.

Samples 124, 126 and 128 are fed to majority circuit 114, which is operative to produce binary output data 50 according to a majority among samples 124, 126 and 128. More specifically, if none or only one of samples 124, 126 and 128 are logic 1, data output 50 is logic 0. If two or three of samples 124, 126 and 128 are logic 1, data output 50 is logic 1.

In this embodiment, the combination of an increment skew correction 56a and a decrement skew correction 56b form skew correction 56 (FIG. 3).

Early sample 124 and output data 50 are compared by early comparator 118 to produce increment skew correction 56a. A difference between early sample 124 and output data 50 indicates that sampling is taking place too early, so up-down counter 96 is incremented, subject to wrap-around, in order to retard sampling of a subsequent bit.

Late sample 128 and output data 50 are compared by late comparator 120 to produce decrement skew correction 56b. A difference between late sample 128 and output data 50 indicates that sampling is taking place too late, so up-down counter 96 is decremented, subject to wrap-around, in order to advance sampling of a subsequent bit.

If both early sample 124 and late sample 128 are in agreement with output data 50, no adjustment is necessary so up-down counter 96 is left unchanged.

While the invention has been described with respect to a limited number of embodiments, it will be appreciated that many variations, modifications and other applications of the invention may be made.

What is claimed is:
1. A digital communication system comprising:
 (a) a host, said host including:
  (i) a clock operative to produce a clock signal having a clock rate;
  (ii) a receiver operative to sample bits of a bit stream according to a sampling timing determined according to said clock signal;
  (iii) a skew compensation mechanism operative to adjust said sampling timing;
  (iv) a voting mechanism operative to detect a skew between said clock signal and said bit stream according to a vote among at least three samples of a bit of said bit stream, and to adjust, via said skew compensation mechanism, said sampling timing so as to compensate for said skew, and (v) a training mechanism operative to detect a skew between said clock signal and a training bit stream, said training mechanism being further operative, via said skew compensation mechanism, to adjust said sampling timing so as to compensate for said skew, and (b) a device operative to transmit said bit stream and said training bit stream to said host, said bit stream and said training bit stream being synchronized according to said clock signal supplied by said host, said device lacking a clock, and wherein said skew compensation mechanism is operative to adjust, substantially in real time, said sampling timing so as to compensate for said skew of (iv) and said skew of (v).

2. The system of claim 1, wherein said samples in said vote include at least one early sample, at least one intermediate sample and at least one late sample.

3. The system of claim 1, wherein said skew compensation mechanism includes a digitally adjustable sampling control mechanism operative to adjust timing of sampling of a bit of said bit stream according to a digital value, said digital value being in accordance with said vote.

4. The system of claim 3, wherein said host is operative to store said digital value in a memory, and to subsequently restore said digital value according to said memory.

5. The system of claim 3, wherein said digitally adjustable sampling control mechanism is operative to adjust timing of sampling of a bit of said bit stream according to a digital value that can be selected from at least four possible digital values.

6. The system of claim 2, wherein said compensation includes retarding sampling of a subsequent bit if at least one said early sample is in disagreement with said vote.

7. The system of claim 2, wherein said compensation includes advancing sampling of a subsequent bit if at least one said late sample is in disagreement with said vote.

8. The system of claim 2, wherein said compensation includes retarding sampling of a subsequent bit if at least one said early sample is in disagreement with said vote and wherein said compensation further includes advancing sampling of a subsequent bit if at least one said late sample is in disagreement with said vote.

9. The system of claim 1, wherein said bit stream includes user data.

10. The system of claim 1, wherein said bit stream has a bit rate twice said clock rate.

11. The system of claim 1, wherein said bit stream has a bit rate quadruple said clock rate.

12. The system of claim 1, wherein said bit stream has a bit rate eight times said clock rate.

13. The system of claim 1, wherein said bit stream has a bit rate that is an integer multiple of said clock rate.

14. A digital communication system comprising a host, said host including:

(a) a clock operative to produce a clock signal having a clock rate;

(b) a receiver operative to sample bits of a bit stream according to a sampling timing determined according to said clock signal;

(c) a skew compensation mechanism operative to adjust said sampling timing;

(d) a voting mechanism operative to detect a skew between said clock signal and said bit stream according to a vote among at least three samples of a bit of said bit stream, and to adjust, via said skew compensation mechanism, said sampling timing so as to compensate for said skew, and (e) a training mechanism operative to detect a skew between said clock signal and a training bit stream, said training mechanism being further operative, via said skew compensation mechanism, to adjust said sampling timing so as to compensate for said skew, and wherein said skew compensation mechanism is operative to adjust, substantially in real time, said sampling timing so as to compensate for said skew of (d) and said skew of (e).

15. The system of claim 14, wherein said samples in said vote include at least one early sample, at least one intermediate sample and at least one late sample.

16. The system of claim 14, wherein said skew compensation mechanism includes a digitally adjustable sampling control mechanism operative to adjust timing of sampling of a bit of said bit stream according to a digital value, said digital value being in accordance with said vote.

17. The system of claim 16, wherein said host is operative to store said digital value in a memory, and to subsequently restore said digital value according to said memory.

18. The system of claim 16, wherein said digitally adjustable sampling control mechanism is operative to adjust timing of sampling of a bit of said bit stream according to a digital value that can be selected from at least four possible digital values.

19. The system of claim 15, wherein said compensation includes retarding sampling of a subsequent bit if at least one said early sample is in disagreement with said vote.

20. The system of claim 15, wherein said compensation includes advancing sampling of a subsequent bit if at least one said late sample is in disagreement with said vote.

21. The system of claim 15, wherein said compensation includes retarding sampling of a subsequent bit if at least one said early sample is in disagreement with said vote and wherein said compensation further includes advancing sampling of a subsequent bit if at least one said late sample is in disagreement with said vote.

22. The system of claim 14, wherein said bit stream includes user data.

23. The system of claim 14, wherein said bit stream has a bit rate twice said clock rate.

24. The system of claim 14, wherein said bit stream has a bit rate quadruple said clock rate.

25. The system of claim 14, wherein said bit stream has a bit rate eight times said clock rate.

26. The system of claim 14, wherein said bit stream has a bit rate that is an integer multiple of said clock rate.

* * * * *